US012786818B2

(12) United States Patent
Gürsu et al.

(10) Patent No.: US 12,786,818 B2
(45) Date of Patent: Nov. 3, 2026

(54) SLICE-SPECIFIC CELL RE-DIRECTION

(71) Applicant: Nokia Technologies Oy, Espoo (FI)

(72) Inventors: Halit Murat Gürsu, Munich (DE); Philippe Godin, Versailles (FR); Sung Hwan Won, Flower Mound, TX (US); Ömer Bulakci, Munich (DE); Muhammad Naseer-Ul-Islam, Munich (DE); Ahmad Awada, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 335 days.

(21) Appl. No.: 18/711,351

(22) PCT Filed: Nov. 24, 2021

(86) PCT No.: PCT/US2021/060750
§ 371 (c)(1),
(2) Date: May 17, 2024

(87) PCT Pub. No.: WO2023/096644
PCT Pub. Date: Jun. 1, 2023

(65) Prior Publication Data
US 2025/0016636 A1 Jan. 9, 2025

(51) Int. Cl.
*H04W 36/00* (2009.01)

(52) U.S. Cl.
CPC ... *H04W 36/0072* (2013.01); *H04W 36/0061* (2013.01)

(58) Field of Classification Search
CPC ...................... H04W 36/0061; H04W 36/0072
See application file for complete search history.

(56) References Cited

U.S. PATENT DOCUMENTS 10,582,560 B2 3/2020 Park et al.
2010/0039996 A1* 2/2010 Ohta ...................... H04L 47/34 370/328

(Continued)

FOREIGN PATENT DOCUMENTS

WO 2019/099661 A1 5/2019
WO 2020/064095 A1 4/2020

(Continued)

OTHER PUBLICATIONS

"3rd Generation Partnership Project; Technical Specification Group Radio Access Network; NG-RAN; XN application protocol (XnAP) (Release 16)", 3GPP TS 38.423 V16.6.0, Jul. 2021, pp. 1-464.

(Continued)

*Primary Examiner* — Zhiren Qin
(74) *Attorney, Agent, or Firm* — Carter, DeLuca & Farrell LLP

(57) ABSTRACT

A method including receiving, from a second cell, a paging message associated with a network slice supported by a first cell, wherein the paging message includes at least an indication indicating to wait for a command indicative of performing a re-direction or a handover from the second cell to the first cell before transmitting a service request to a network associated with the first cell and the second cell; performing, by the terminal device, the re-direction or the handover from the second cell to the first cell upon receiving the command; and transmitting, through the first cell, the service request upon completing the re-direction or the handover from the second cell to the first cell, wherein the service request indicates a request for establishing a protocol data unit session associated with the network slice.

13 Claims, 9 Drawing Sheets

(56) References Cited

U.S. PATENT DOCUMENTS

| | | | |
|---|---|---|---|
| 2017/0290037 A1 | 10/2017 | Goel et al. | |
| 2018/0199240 A1 | 7/2018 | Dao et al. | |
| 2018/0324645 A1 | 11/2018 | Park et al. | |
| 2018/0376444 A1 | 12/2018 | Kim et al. | |
| 2019/0208463 A1 | 7/2019 | Lou et al. | |
| 2019/0357131 A1 | 11/2019 | Sivavakeesar et al. | |
| 2020/0305054 A1 | 9/2020 | Zee et al. | |
| 2021/0105675 A1* | 4/2021 | Kim | H04W 12/03 |
| 2021/0144674 A1 | 5/2021 | Zhang et al. | |
| 2021/0368399 A1* | 11/2021 | Zou | H04W 36/00837 |
| 2022/0225202 A1* | 7/2022 | Fujishiro | H04W 36/0085 |

FOREIGN PATENT DOCUMENTS

| | | |
|---|---|---|
| WO | 2021/113581 A1 | 6/2021 |
| WO | 2021/183870 A1 | 9/2021 |
| WO | 2023/280580 A1 | 1/2023 |

OTHER PUBLICATIONS

"3rd Generation Partnership Project; Technical Specification Group Radio Access Network; NR; NR and NG-RAN Overall Description; Stage 2 (Release 16)", 3GPP TS 38.300 V16.6.0, Jun. 2021, pp. 1-152.

"3rd Generation Partnership Project; Technical Specification Group Services and System Aspects; System architecture for the 5G System (5GS); Stage 2 (Release 17)", 3GPP TS 23.501 V17.1.1, Jun. 2021, pp. 1-526.

"3rd Generation Partnership Project; Technical Specification Group Core Network and Terminals; Numbering, addressing and identification; (Release 17)", 3GPP TS 23.003 V17.2.0, Jun. 2021, pp. 1-144.

"Reply LS on the applicability of service area restriction and NSSAIs to EPLMNs", 3GPP TSG-SA WG2 Meeting #129, S2-1811546, SA2, Oct. 15-19, 2018, 2 pages.

"LS on Cell Configuration within TA/RA to Support Allowed NSSAI", 3GPP TSG CT WG1 Meeting 126-e, TDoc C1-206760, CT1, Oct. 15-23, 2020, 1 page.

"3rd Generation Partnership Project; Technical Specification Group RAN; NR; Study on enhancement of Radio Access Network (RAN) slicing (Release 17)", 3GPP TR 38.832, V17.0.0, Jun. 2021, pp. 1-31.

Manjeshwar et al., "Enhanced UE Slice Mobility for 5G Multi-RAT Networks", IEEE Conference on Network Function Virtualization and Software Defined Networks (NFV-SDN), Nov. 12-14, 2019, 6 pages.

"Introduction of Paging Cause feature", SA WG2 Meeting #143E (e-meeting), S2-210XXXX, vivo, Feb. 24-Mar. 9, 2021, 27 pages.

Extended European Search Report received for corresponding European Patent Application No. 21965836.6 dated Jul. 8, 2025, 10 pages.

International Search Report issued by the United States Patent and Trademark Office acting as the International Searching Authority in relation to International Application No. PCT/US2021/060750 issued Feb. 4, 2022 (3 pages).

Written Opinion of the International Searching Authority issued by the United States Patent and Trademark Office acting as the International Searching Authority in relation to International Application No. PCT/US2021/060750 issued Feb. 4, 2022 (29 pages).

* cited by examiner

SLICE-SPECIFIC CELL RE-DIRECTION

CROSS-REFERENCE TO RELATED APPLICATIONS

This application is a national phase entry under 35 U.S.C. 371 of PCT International Application No. PCT/US2021/060750 filed Nov. 24, 2021 the disclosure of this application is expressly incorporated herein by reference in its entirety.

FIELD

The following exemplary embodiments relate to wireless communication.

BACKGROUND

Paging is a mechanism that may be used to initiate communication services for terminal devices that are in idle or inactive state. However, if the terminal device is camping on a cell that does not support the paged network slice, then the terminal device may not be able to receive the paging message. Thus, it is desirable to improve the paging mechanism.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive, from a second cell, a paging message associated with a network slice supported by a first cell, wherein the paging message comprises at least an indication indicating the apparatus to wait for a command indicative of performing a re-direction or a handover from the second cell to the first cell before transmitting a service request to a network associated with the first cell and the second cell; perform the re-direction or the handover from the second cell to the first cell upon receiving the command indicative of performing the re-direction or the handover from the second cell to the first cell; and transmit, through the first cell, the service request upon completing the re-direction or the handover from the second cell to the first cell, wherein the service request indicates a request for establishing a protocol data unit session between the apparatus and the network, wherein the protocol data unit session is associated with the network slice.

According to another aspect, there is provided an apparatus comprising means for: receiving, from a second cell, a paging message associated with a network slice supported by a first cell, wherein the paging message comprises at least an indication indicating the apparatus to wait for a command indicative of performing a re-direction or a handover from the second cell to the first cell before transmitting a service request to a network associated with the first cell and the second cell; performing the re-direction or the handover from the second cell to the first cell upon receiving the command indicative of performing the re-direction or the handover from the second cell to the first cell; and transmitting, through the first cell, the service request upon completing the re-direction or the handover from the second cell to the first cell, wherein the service request indicates a request for establishing a protocol data unit session between the apparatus and the network, wherein the protocol data unit session is associated with the network slice.

According to another aspect, there is provided a method comprising: receiving, by a terminal device, from a second cell, a paging message associated with a network slice supported by a first cell, wherein the paging message comprises at least an indication indicating the terminal device to wait for a command indicative of performing a re-direction or a handover from the second cell to the first cell before transmitting a service request to a network associated with the first cell and the second cell; performing, by the terminal device, the re-direction or the handover from the second cell to the first cell upon receiving the command indicative of performing the re-direction or the handover from the second cell to the first cell; and transmitting, by the terminal device, through the first cell, the service request upon completing the re-direction or the handover from the second cell to the first cell, wherein the service request indicates a request for establishing a protocol data unit session between the terminal device and the network, wherein the protocol data unit session is associated with the network slice.

According to another aspect, there is provided a computer program product comprising program instructions which, when run on a computing apparatus, cause the computing apparatus to perform at least the following: receiving, from a second cell, a paging message associated with a network slice supported by a first cell, wherein the paging message comprises at least an indication indicating the apparatus to wait for a command indicative of performing a re-direction or a handover from the second cell to the first cell before transmitting a service request to a network associated with the first cell and the second cell; performing the re-direction or the handover from the second cell to the first cell upon receiving the command indicative of performing the re-direction or the handover from the second cell to the first cell; and transmitting, through the first cell, the service request upon completing the re-direction or the handover from the second cell to the first cell, wherein the service request indicates a request for establishing a protocol data unit session between the apparatus and the network, wherein the protocol data unit session is associated with the network slice.

According to another aspect, there is provided a computer program comprising instructions for causing an apparatus to perform at least the following: receiving, from a second cell, a paging message associated with a network slice supported by a first cell, wherein the paging message comprises at least an indication indicating the apparatus to wait for a command indicative of performing a re-direction or a handover from the second cell to the first cell before transmitting a service request to a network associated with the first cell and the second cell; performing the re-direction or the handover from the second cell to the first cell upon receiving the command indicative of performing the re-direction or the handover from the second cell to the first cell; and transmitting, through the first cell, the service request upon completing the re-direction or the handover from the second cell to the first cell, wherein the service request indicates a request for establishing a protocol data unit session between the apparatus and the network, wherein the protocol data unit session is associated with the network slice.

According to another aspect, there is provided a computer readable medium comprising program instructions for causing an apparatus to perform at least the following: receiving, from a second cell, a paging message associated with a network slice supported by a first cell, wherein the paging message comprises at least an indication indicating the apparatus to wait for a command indicative of performing a re-direction or a handover from the second cell to the first cell before transmitting a service request to a network associated with the first cell and the second cell; performing the re-direction or the handover from the second cell to the first cell upon receiving the command indicative of performing the re-direction or the handover from the second cell to the first cell; and transmitting, through the first cell, the service request upon completing the re-direction or the handover from the second cell to the first cell, wherein the service request indicates a request for establishing a protocol data unit session between the apparatus and the network, wherein the protocol data unit session is associated with the network slice.

According to another aspect, there is provided a non-transitory computer readable medium comprising program instructions for causing an apparatus to perform at least the following: receiving, from a second cell, a paging message associated with a network slice supported by a first cell, wherein the paging message comprises at least an indication indicating the apparatus to wait for a command indicative of performing a re-direction or a handover from the second cell to the first cell before transmitting a service request to a network associated with the first cell and the second cell; performing the re-direction or the handover from the second cell to the first cell upon receiving the command indicative of performing the re-direction or the handover from the second cell to the first cell; and transmitting, through the first cell, the service request upon completing the re-direction or the handover from the second cell to the first cell, wherein the service request indicates a request for establishing a protocol data unit session between the apparatus and the network, wherein the protocol data unit session is associated with the network slice.

According to another aspect, there is provided an apparatus comprising at least one processor, and at least one memory including computer program code, wherein the at least one memory and the computer program code are configured, with the at least one processor, to cause the apparatus to: receive, from an access and mobility management function in a network, a first paging message for a terminal device, wherein the first paging message is associated with a network slice supported by a first cell; determine a radio coverage overlap between the first cell and a second cell, wherein the second cell is controlled by the apparatus; and transmit, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice.

According to another aspect, there is provided an apparatus comprising means for: receiving, from an access and mobility management function in a network, a first paging message for a terminal device, wherein the first paging message is associated with a network slice supported by a first cell; determining a radio coverage overlap between the first cell and a second cell, wherein the second cell is controlled by the apparatus; and transmitting, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice.

According to another aspect, there is provided a method comprising: receiving, by a network element, from an access and mobility management function in a network, a first paging message for a terminal device, wherein the first paging message is associated with a network slice supported by a first cell; determining, by the network element, a radio coverage overlap between the first cell and a second cell, wherein the second cell is controlled by the network element; and transmitting, by the network element, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice.

According to another aspect, there is provided a computer program comprising instructions for causing an apparatus to perform at least the following: receiving, from an access and mobility management function in a network, a first paging message for a terminal device, wherein the first paging message is associated with a network slice supported by a first cell; determining a radio coverage overlap between the first cell and a second cell, wherein the second cell is controlled by the apparatus; and transmitting, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice.

According to another aspect, there is provided a computer program product comprising program instructions which, when run on a computing apparatus, cause the computing apparatus to perform at least the following: receiving, from an access and mobility management function in a network, a first paging message for a terminal device, wherein the first paging message is associated with a network slice supported by a first cell; determining a radio coverage overlap between the first cell and a second cell, wherein the second cell is controlled by the apparatus; and transmitting, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice.

According to another aspect, there is provided a computer readable medium comprising program instructions for causing an apparatus to perform at least the following: receiving, from an access and mobility management function in a network, a first paging message for a terminal device, wherein the first paging message is associated with a network slice supported by a first cell; determining a radio coverage overlap between the first cell and a second cell, wherein the second cell is controlled by the apparatus; and transmitting, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice.

According to another aspect, there is provided a non-transitory computer readable medium comprising program instructions for causing an apparatus to perform at least the following: receiving, from an access and mobility management function in a network, a first paging message for a terminal device, wherein the first paging message is associated with a network slice supported by a first cell; determining a radio coverage overlap between the first cell and a second cell, wherein the second cell is controlled by the apparatus; and transmitting, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice.

According to another aspect, there is provided an apparatus in a network, the apparatus comprising at least one processor, and at least one memory including computer program code, wherein the at least one memory and the computer program code are configured, with the at least one processor, to cause the apparatus to: transmit, to a network element controlling a second cell, a paging message for a terminal device, wherein the paging message is associated with a network slice supported by a first cell; and receive a service request from the terminal device via the first cell, wherein the service request indicates a request for establishing a protocol data unit session between the terminal device and the network, wherein the protocol data unit session is associated with the network slice.

According to another aspect, there is provided an apparatus in a network, wherein the apparatus comprises means for: transmitting, to a network element controlling a second cell, a paging message for a terminal device, wherein the paging message is associated with a network slice supported by a first cell; and receiving a service request from the terminal device via the first cell, wherein the service request indicates a request for establishing a protocol data unit session between the terminal device and the network, wherein the protocol data unit session is associated with the network slice.

According to another aspect, there is provided a method comprising: transmitting, by an access and mobility management function in a network, to a network element controlling a second cell, a paging message for a terminal device, wherein the paging message is associated with a network slice supported by a first cell; and receiving, by the access and mobility management function, a service request from the terminal device via the first cell, wherein the service request indicates a request for establishing a protocol data unit session between the terminal device and the network, wherein the protocol data unit session is associated with the network slice.

According to another aspect, there is provided a computer program comprising instructions for causing an apparatus in a network to perform at least the following: transmitting, to a network element controlling a second cell, a paging message for a terminal device, wherein the paging message is associated with a network slice supported by a first cell; and receiving a service request from the terminal device via the first cell, wherein the service request indicates a request for establishing a protocol data unit session between the terminal device and the network, wherein the protocol data unit session is associated with the network slice.

According to another aspect, there is provided a computer program product comprising program instructions which, when run on a computing apparatus in a network, cause the computing apparatus to perform at least the following: transmitting, to a network element controlling a second cell, a paging message for a terminal device, wherein the paging message is associated with a network slice supported by a first cell; and receiving a service request from the terminal device via the first cell, wherein the service request indicates a request for establishing a protocol data unit session between the terminal device and the network, wherein the protocol data unit session is associated with the network slice.

According to another aspect, there is provided a computer readable medium comprising program instructions for causing an apparatus in a network to perform at least the following: transmitting, to a network element controlling a second cell, a paging message for a terminal device, wherein the paging message is associated with a network slice supported by a first cell; and receiving a service request from the terminal device via the first cell, wherein the service request indicates a request for establishing a protocol data unit session between the terminal device and the network, wherein the protocol data unit session is associated with the network slice.

According to another aspect, there is provided a non-transitory computer readable medium comprising program instructions for causing an apparatus in a network to perform at least the following: transmitting, to a network element controlling a second cell, a paging message for a terminal device, wherein the paging message is associated with a network slice supported by a first cell; and receiving a service request from the terminal device via the first cell, wherein the service request indicates a request for establishing a protocol data unit session between the terminal device and the network, wherein the protocol data unit session is associated with the network slice.

According to another aspect, there is provided a system comprising at least an access and mobility management function in a network, a terminal device, and a network element in a radio access network. The access and mobility management function is configured to: transmit, to the network element, a first paging message for the terminal device, wherein the first paging message is associated with a network slice supported by a first cell; and receive a service request from the terminal device via the first cell, wherein the service request indicates a request for establishing a protocol data unit session between the terminal device and the network, wherein the protocol data unit session is associated with the network slice. The network element is configured to: receive, from the access and mobility management function, the first paging message; determine a radio coverage overlap between the first cell and a second cell, wherein the second cell is controlled by the network element; and transmit, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice. The terminal device is configured to: receive, from the second cell, the second paging message; perform the re-direction or the handover from the second cell to the first cell upon receiving the command indicative of performing the re-direction or the handover from the second cell to the first cell; and transmit, through the first cell, the service request upon completing the re-direction or the handover from the second cell to the first cell.

According to another aspect, there is provided a system comprising at least an access and mobility management function in a network, a terminal device, and a network element in a radio access network. The access and mobility management function comprises means for: transmitting, to the network element, a first paging message for the terminal device, wherein the first paging message is associated with a network slice supported by a first cell; and receiving a service request from the terminal device via the first cell, wherein the service request indicates a request for establishing a protocol data unit session between the terminal device and the network, wherein the protocol data unit session is associated with the network slice. The network element comprises means for: receiving, from the access and mobility management function, the first paging message; determining a radio coverage overlap between the first cell and a second cell, wherein the second cell is controlled by the network element; and transmitting, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice. The terminal device comprises means for: receiving, from the second cell, the second paging message; performing the re-direction or the handover from the second cell to the first cell upon receiving the command indicative of performing the re-direction or the handover from the second cell to the first cell; and transmitting, through the first cell, the service request upon completing the re-direction or the handover from the second cell to the first cell.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to “an”, “one”, or “some” embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), or beyond 5G, without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
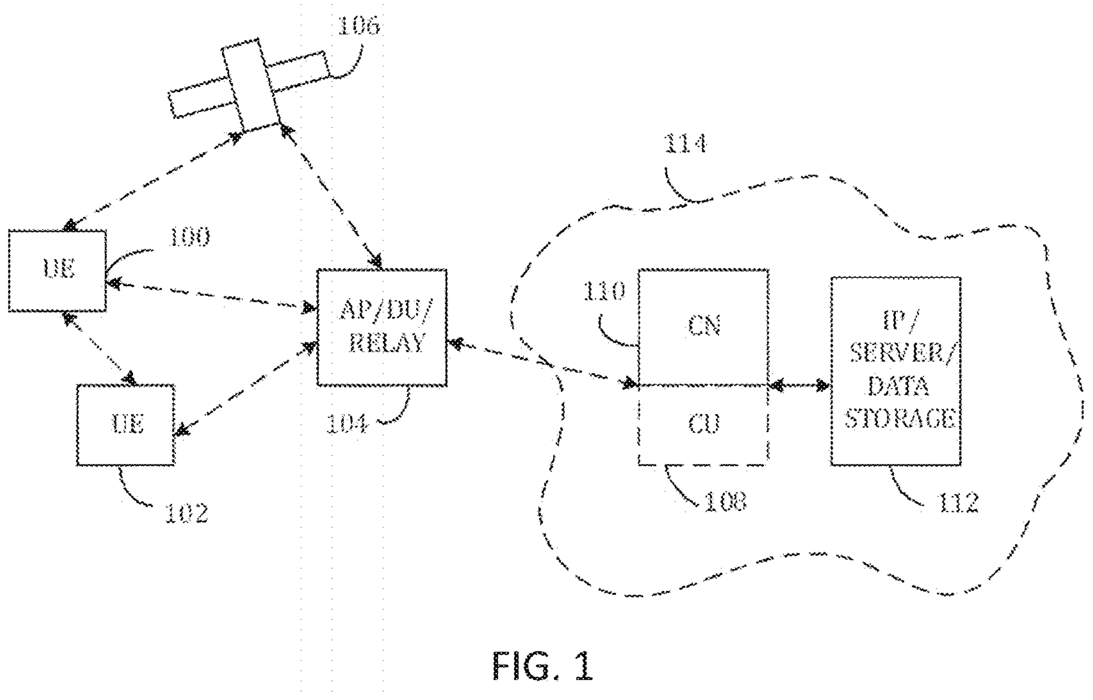
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cm Wave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize non-terrestrial communication, e.g., satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home (e/g) nodeB.

Furthermore, the (e/g) nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station. The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Network slicing may be used to create independent virtual/logical networks within the same physical network. These virtual/logical networks may be referred to as network slices, and they may be used for distinct applications with specific requirements. Network slices may differ in their service requirements, such as ultra-reliable low latency communication (URLLC) and enhanced mobile broadband (eMBB), or the tenant that provides those services.

A network slice may be uniquely identified by the single-network slice selection assistance information (S-NSSAI). According to current specifications, a UE may be simultaneously connected and served by up to eight network slices corresponding to eight S-NSSAIs. On the other hand, a given cell may support tens or even hundreds of network slices. For example, according to current specifications, a tracking area may support up to 1024 network slices.

Figure 2:
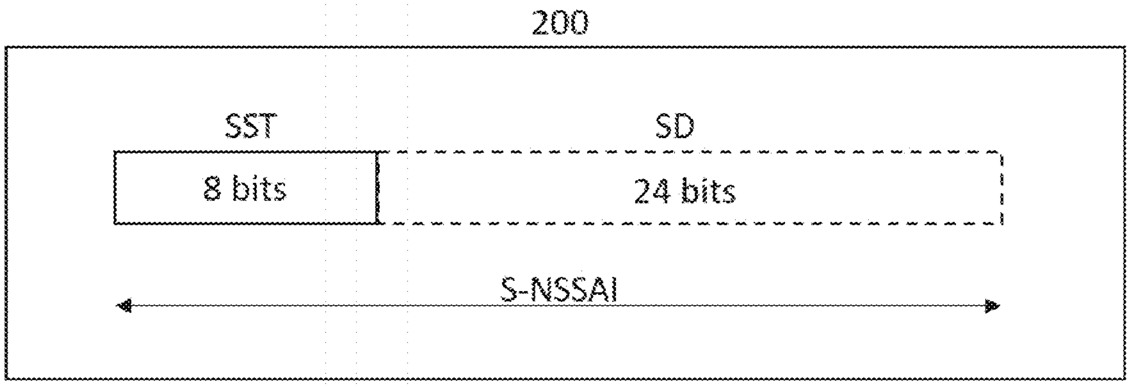
FIG. 2 illustrates an example of single-network slice selection assistance information.

FIG. 2 illustrates an example of an S-NSSAI 200. The S-NSSAI 200 may comprise a slice service type (SST) field with a length of 8 bits and a slice differentiator (SD) field with a length of 24 bits, in which case the total length of the S-NSSAI is 32 bits. Alternatively, the S-NSSAI may comprise just the SST field without the SD field, in which case the length of the S-NSSAI is 8 bits. The SST field may have standardized and non-standardized values. Values 0 to 127 belong to the standardized SST range. For instance, an SST value of 1 may indicate that the slice is suitable for handling of 5G eMBB, and an SST value of 2 may indicate that the slice is suitable for handling of URLLC. SD may be operator-defined.

According to current specifications, a registration area (RA) is a list comprising one or more tracking areas (TAs). A given tracking area may comprise one or more cells. The registration area may be configured to a given UE by the network. The registration area may be used to track the UE location for paging purposes. If the UE leaves the registration area, the UE may indicate the leaving to the network via a non-access stratum (NAS) registration request, such that the correct registration area can be configured to the UE.

In 5G, the registration area also has the role of maintaining the allowed network slices (allowed NSSAI) of the UE. The allowed NSSAI (network slice selection assistance information) comprises one or more allowed S-NSSAIs (i.e., allowed network slices) of the UE. The allowed NSSAI may be configured to the UE by the network. The UE NAS may request access to a specific S-NSSAI, and the network may decide whether or not to add that S-NSSAI to the UE's allowed NSSAI.

There may be homogenous slice support in a given tracking area, which means that the same network slice(s) may be supported throughout the tracking area.

Paging is a mechanism that may be used to initiate communication services for UEs that are in RRC idle state or RRC inactive state. For example, the network may transmit a paging message to a UE in idle/inactive state in order to switch the UE to connected state, when the network needs to transmit downlink data to the UE. Paging may also be used by the network for other purposes, such as providing an earthquake and tsunami warning system (ETWS) notification to the UE, for triggering the UE to acquire a system information update, and/or for indicating the availability of a tracking reference signal (TRS) to the UE.

Thus, the UE may occasionally wake up to monitor whether the network is sending any paging message to it, but the UE has to spend some energy (battery power) to run this monitoring process on those time occasions. However, the UE can conserve its battery power by sleeping during the time when the network is not transmitting paging messages (instead of continuously monitoring for the paging messages).

This kind of reception mechanism may be referred to as discontinuous reception (DRX). During the idle/inactive state, the UE stays in sleep mode according to a DRX cycle, which may also be referred to as a paging cycle. The paging cycle indicates the time interval after which the UE wakes up and monitors for the paging message. The network may indicate the default paging cycle to the UE in system information block type 1 (SIB1), for example. The UE may determine its paging cycle based on the shortest of the UE-specific DRX value(s) (if configured by RRC and/or upper layers), and/or the default paging cycle (default DRX value) broadcast in system information. In RRC idle state, if a UE-specific DRX value is not configured by the upper layers, the default DRX value may be applied.

As a non-limiting example, if the paging cycle is set to 1280 ms (128 radio frames), then the UE may wake up in frame #3, then again in frame #131 (after 128 frames), and then again in frame #259, and so on. The radio frame in which the UE wakes up is called a paging frame (PF). Within a radio frame, there may be 10 subframes. However, the UE may not remain awake in all 10 subframes of the paging frame. Instead, the UE may wake up in a specific subframe, for example subframe 0, 4, 5 or 9, within the paging frame. These specific subframe(s) within a paging frame, when the UE wakes up, are called paging occasions (PO).

The system information may comprise a parameter NB, which depicts the number of paging subframes within the paging cycle. The UE may determine the paging frame based on the paging cycle, the parameter NB, and the UE identity. The UE identity may be based on the international mobile subscriber identity (IMSI) value of the UE. Once the UE has determined the paging frame, it may determine the subframe of the paging frame to wake up on.

Thus, the UE periodically wakes up according to the paging cycle and monitors a physical downlink control channel (PDCCH) for the paging downlink control information (DCI) in order to check for the presence of a paging message on a physical downlink shared channel (PDSCH). The paging DCI comprises the time-frequency allocation of the paging message on the PDSCH. If there is no allocation, the UE determines that it is not paged. If the PDCCH indicates that a paging message is transmitted in the subframe (i.e., if there is an allocation), then the UE proceeds with receiving the paging message on the PDSCH, and demodulates the paging channel (PCH) to see if the paging message is directed to it (the paging message might not be addressed to this specific UE, since there may be multiple UEs using the same paging cycle). If the UE finds its own identity in the paging message, it considers itself paged and may take appropriate action (e.g., sets up an RRC connection).

In a future NR release, e.g., NR Release 18, the registration area may comprise multiple tracking areas, wherein a given tracking area does not support all of the allowed network slices of the UE. In other words, a given tracking area may support a subset of the allowed network slices of the UE. For example, the UE may have eMBB and URLLC as allowed network slices, wherein a first tracking area supports eMBB (but not URLLC), and a second tracking area supports URLLC (but not eMBB). This allows a more flexible registration area configuration. However, this relaxation may cause issues with the paging mechanism.

Figure 3:
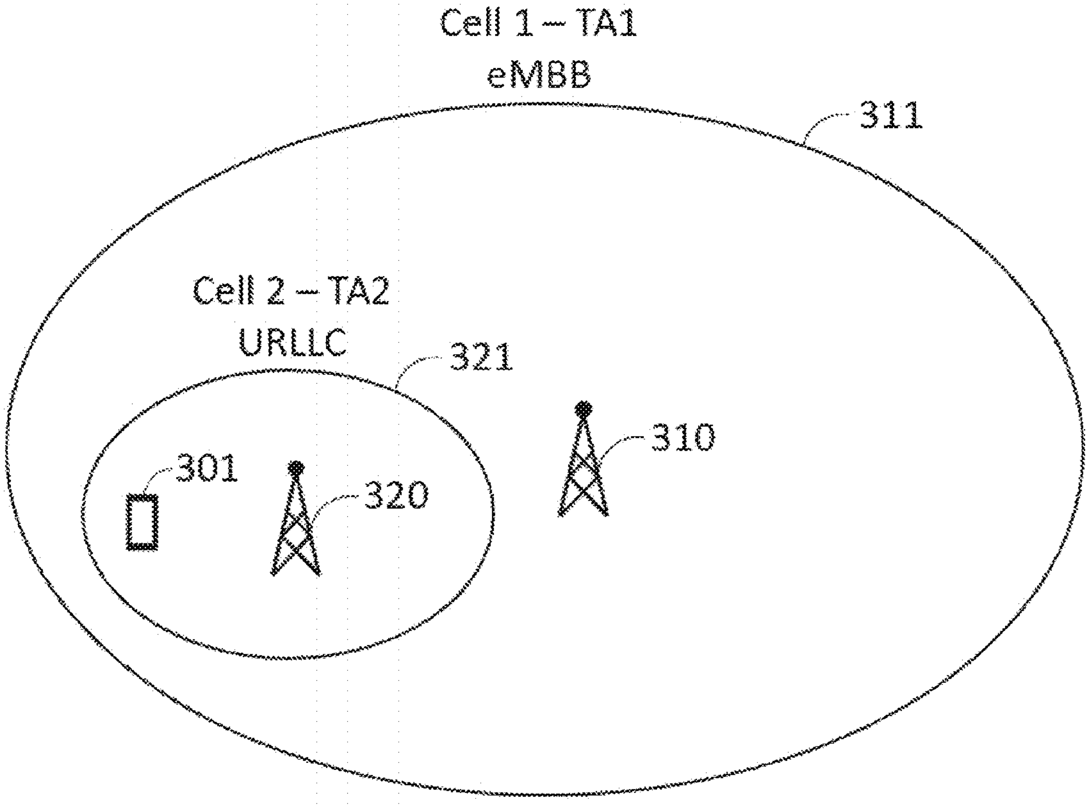
FIG. 3 illustrates tracking areas with non-homogenous slice support.

FIG. 3 illustrates the paging problem with an example scenario, where a UE 301 is configured with a registration area comprising a first tracking area (TA1) and a second tracking area (TA2). TA1 supports eMBB (but not URLLC) and comprises at least a first cell 311 provided by a first base station 310. TA2 supports URLLC (but not eMBB) and comprises at least a second cell 321 provided by a second base station 320. The UE 301 has eMBB and URLLC as allowed network slices. The UE 301 is camping on the second cell 321. When the UE 301 is paged for a protocol data unit (PDU) session of eMBB, the access and mobility management function (AMF) sends the paging message to the first cell 311, which supports eMBB. The AMF may also send the paging message to other cell(s) of TA1, as the other cell(s) of TA1 also support eMBB. However, the AMF may decide to not send the paging message to any cell under TA2, since no cell of TA2 supports eMBB. In this case, the paging message is not transmitted to the second cell 321, in which the UE 301 is camping, and thus the UE 301 does not receive the paging message.

Figure 4:
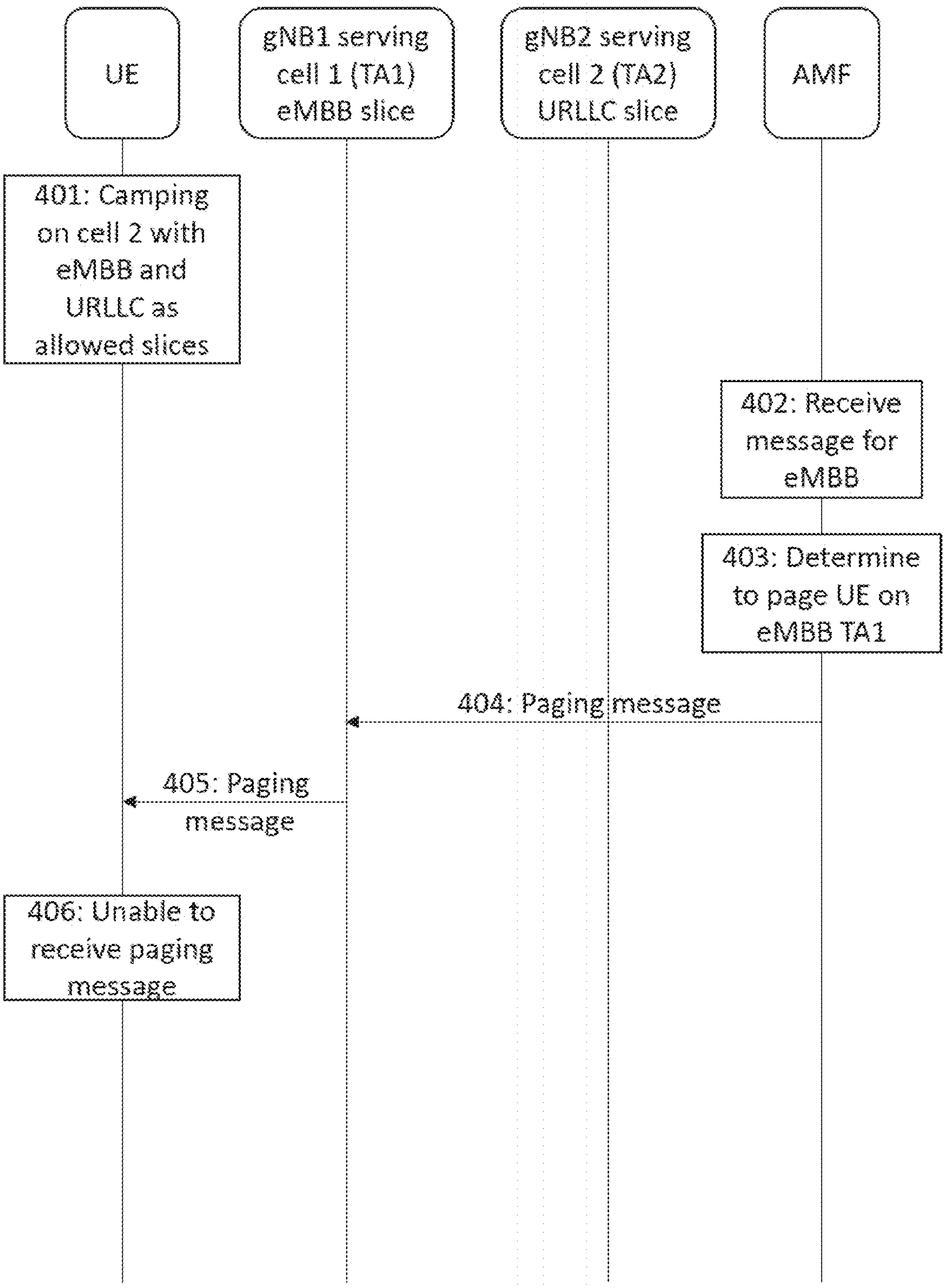
FIG. 4 illustrates a signaling diagram for paging a terminal device over a cell supporting the paged network slice.

FIG. 4 illustrates an exemplary signaling diagram for paging a UE over the cell supporting the paged network slice. In other words, FIG. 4 illustrates the legacy behaviour in the example scenario of FIG. 3.

The UE is configured with a registration area comprising a first tracking area (TA1) and a second tracking area (TA2). TA1 supports eMBB (but not URLLC) and comprises at least a first cell controlled by a first base station (gNB1). TA2 supports URLLC (but not eMBB) and comprises at least a second cell controlled by a second base station (gNB2).

Referring to FIG. 4, in step 401, the UE is camping on the second cell. The UE has eMBB and URLLC as allowed network slices.

In step 402, the AMF receives a message for eMBB.

In step 403, the AMF determines to page the UE for eMBB mobile terminated (MT) data.

In step 404, the AMF transmits a first paging message to the first base station (gNB1) serving the first cell (under TA1), since the first cell is the only cell supporting eMBB in the registration area of the UE.

In step 405, the first base station transmits, to the UE, a second paging message corresponding to the first paging message.

However, in step 406, the UE is unable to receive the second paging message, since the UE is camping on the second cell but not on the first cell.

In other words, the problem with the above legacy behaviour is that the UE is unable to receive the paging message from the first cell due to camping on the second cell, even if the UE is within the radio coverage of the first cell as well (i.e., if the radio coverages of the first cell and the second cell are overlapping as shown in FIG. 3). The UE does not monitor paging occasions from the first cell, when the UE is camping on the second cell.

Some exemplary embodiments may address the above problem by providing enhanced paging behaviour in a registration area with non-homogenous slice support by using slice-specific paging redirection. This may be achieved by enhancing the paging message sent from the AMF and the RAN node (e.g., gNB).

Figure 5:
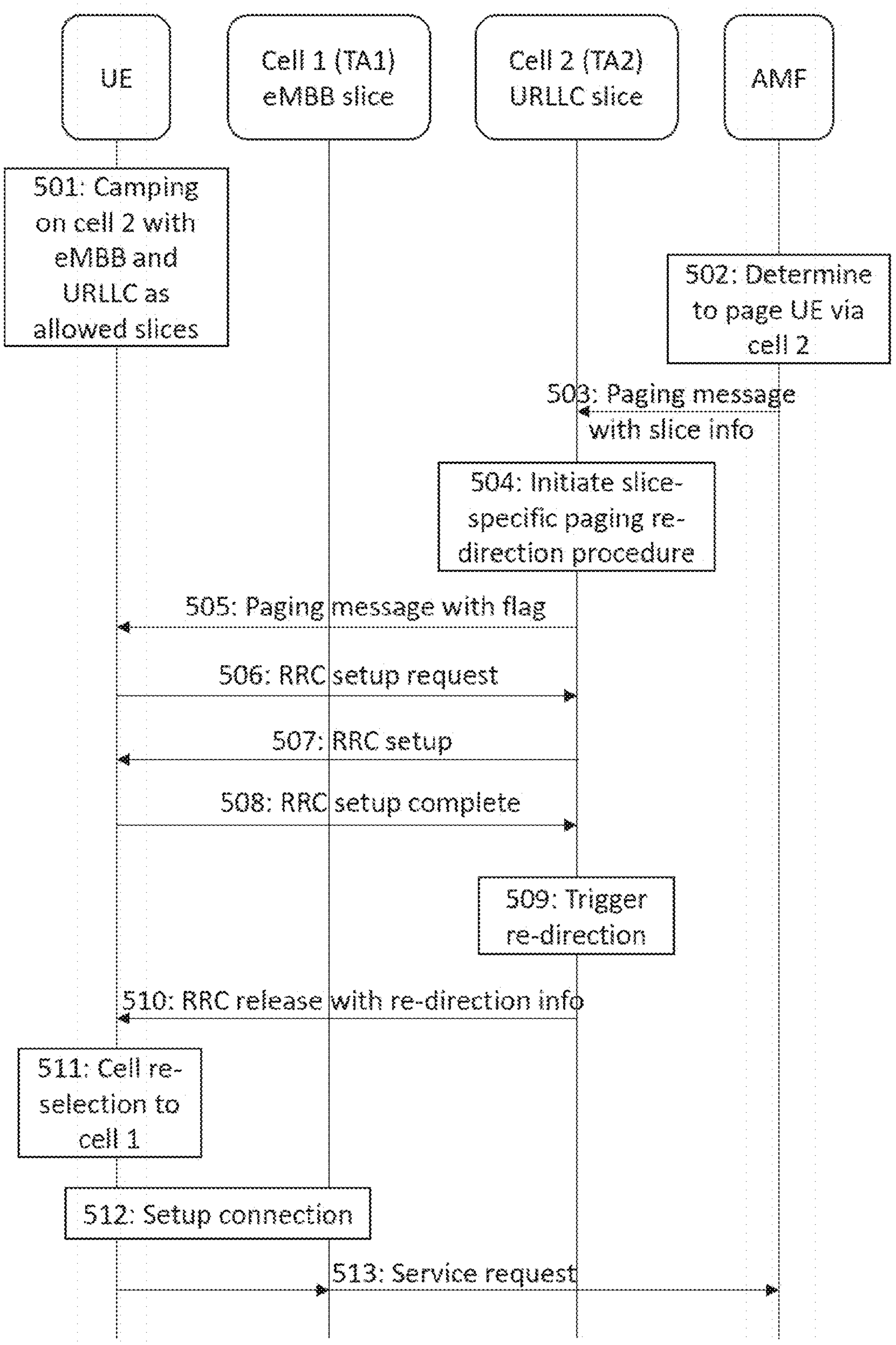
FIGS. 5, 6, 7 and 8 illustrate signaling diagrams according to some exemplary embodiments.

FIG. 5 illustrates a signaling diagram according to an exemplary embodiment. In this exemplary embodiment, the RRC paging message is enhanced with a flag. The flag indicates that the UE should not initiate the service request when connecting to a cell upon receiving a paging message. Instead, the UE should wait for a re-direction, re-selection or handover to another cell before initiating the service request to the AMF. The serving cell (cell 2) identifies the response of the UE to the RRC paging message by storing the UE context and the S-temporary mobile subscription identifier (S-TMSI) UE identity at the NG paging (NG is the interface between RAN and CN). Then the UE is identified in the paging response by matching the stored information to the S-TMSI information provided by the UE in the subsequent RRC setup request message and/or RRC setup complete message. This enables the network to determine that a re-direction, handover or frequency priority modification is needed for the UE. For example, the serving cell (cell 2) may decide to re-direct the UE to another cell (cell 1) by setting frequency priorities with an RRC release command and enabling the UE to send the service request to the AMF through the new cell (cell 1), which supports the paged network slice.

The UE is configured with a registration area comprising a first tracking area (TA1) and a second tracking area (TA2). TA1 supports eMBB (but not URLLC) and comprises at least a first cell (cell 1). TA2 supports URLLC (but not eMBB) and comprises at least a second cell (cell 2). The first cell and the second cell may be controlled by the same network element (e.g., gNB or DU), or the first cell and the second cell may be controlled by different network elements (e.g., gNBs or DUs).

Referring to FIG. 5, in step 501, the UE is camping on the second cell in RRC idle or inactive state. The UE has eMBB and URLLC as allowed network slices.

In step 502, the AMF determines to page the UE for eMBB MT data via the second cell, which does not support eMBB.

In step 503, the AMF transmits a first paging message to the network element controlling the second cell. The first paging message is transmitted together with the slice information of the first paging message. The slice information comprises an indication that the UE is paged for eMBB MT data. The first paging message may comprise the UE identity of the UE.

In step 504, the network element controlling the second cell uses the slice information to initiate a slice-specific re-direction procedure for the UE in order to re-direct the UE to the first cell, which supports eMBB (since the second cell does not support eMBB).

In step 505, the network element controlling the second cell transmits, to the UE, a second paging message corresponding to the first paging message, wherein the second paging message further comprises a flag. The flag indicates to the UE that it needs to wait until completing the re-direction procedure (i.e., steps 509-511) before initiating the service request. In other words, the UE does not yet initiate the service request upon receiving the second paging message. The flag may be a bit that is added to the second paging message by the network element controlling the second cell. The flag may be added to the second paging message independently by the network element. Alternatively, the AMF may know that the network element supports the flag to be added, in which case the AMF may indicate to the network element that the flag needs to be added to the second paging message.

For example, the UE access stratum (AS) layer receiving the flag may not yet inform the NAS layer about the paging. In this case, the UE AS layer may inform the NAS layer after step 512 that the second paging message is received in order to trigger the service request (step 513).

Alternatively, the UE AS layer receiving the flag may inform the NAS layer about the paging upon receiving the flag, and the AS layer may request the NAS layer to suspend triggering the service request procedure. In this case, the UE AS layer may inform the NAS layer after step 512 to initiate the service request procedure (step 513).

In step 506, the UE transmits an RRC setup request message to the network element controlling the second cell in order to request establishing an RRC connection between the UE and the second cell. The RRC setup request message may comprise information on the UE identity (e.g., S-TMSI) of the UE.

In step 507, the network element controlling the second cell transmits an RRC setup message with an SRB1 configuration to the UE. SRB1 is a type of signaling radio bearer (SRB). SRB is a radio bearer that may be used for transmission of RRC and/or NAS messages. The UE switches to RRC connected state.

In step 508, the UE transmits an RRC setup complete message to the network element controlling the second cell to indicate that the RRC connection is successfully established. The RRC setup complete message may comprise information on the UE identity (e.g., S-TMSI) of the UE.

The network element controlling the second cell may use the UE identity (received from the AMF in step 503 and from the UE in step 506) to correlate the RRC setup request message (as a response) to the second paging message sent in step 505. In other words, the network element may check whether the UE identity indicated in the RRC setup request message corresponds to the UE identity indicated in the first paging message.

In step 509, the network element controlling the second cell determines from the UE identity (e.g., stored S-TMSI) indicated in the RRC setup request message and/or RRC setup complete message that a re-direction to the first cell is needed for the UE, and thus the network element triggers (i.e., initiates) the re-direction to the first cell. In other words, the network element may trigger the re-direction to the first cell for the UE, if the UE identity indicated in the RRC setup request message and/or RRC setup complete message corresponds to the UE identity indicated in the first paging message. The network element may take into account the slice information from the AMF for re-directing the UE.

In step 510, the network element controlling the second cell transmits an RRC release command to the UE in order to release the connection between the UE and the second cell. The RRC release command may be transmitted together with re-direction information comprising a cell identity of the first cell and/or a frequency priority indicative of the first cell.

In step 511, the UE performs a cell re-selection procedure to select the first cell based at least partly on the cell identity and/or the frequency priority. In other words, the cell identity and/or the frequency priority may be used as criteria for cell re-selection in order to make the UE select the first cell.

In step 512, the UE establishes an RRC connection to the network element controlling the first cell in order to connect (or reconnect) to the first cell. The UE switches to RRC connected state.

In step 513, upon connecting (or reconnecting) to the first cell, the UE transmits the service request to the network element controlling the first cell, and the network element transmits, or forwards, the service request to the AMF. With the service request, the UE may request a service from the core network. In response to the service request, an eMBB PDU session may be established for the UE by the user plane function (UPF) of the core network. The AMF may coordinate this procedure.

In case the UE connects (or reconnects) to another cell that does not support the paged network slice, the UE may wait in idle state for another paging message, or the UE may reset the frequency priorities or re-direction in an attempt to return back to the second cell.

It should be noted that herein the terms "first cell" and "second cell" are used to distinguish the cells, and they do not necessarily mean a specific order of the cells. Similarly, the terms "first tracking" and "second tracking area" are used to distinguish the tracking areas, and they do not necessarily mean a specific order of the tracking areas.

It should be noted that herein URLLC and eMBB are used as non-limiting examples of network slices. Some exemplary embodiments may also be used for other network slices than URLLC and eMBB.

Figure 6:
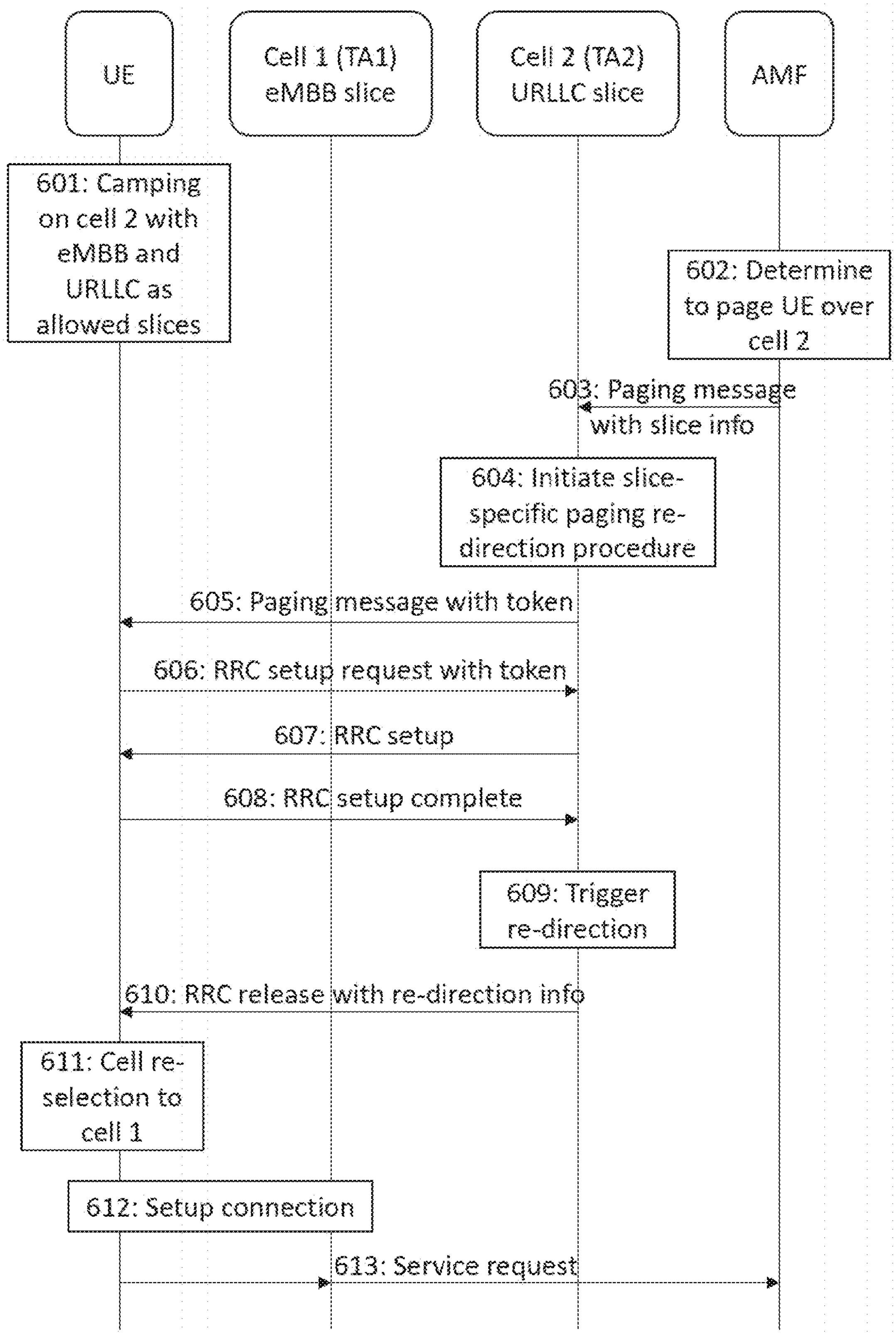

FIG. 6 illustrates a signaling diagram according to another exemplary embodiment. In this exemplary embodiment, the RRC paging message is enhanced with a token. The token is echoed by the UE in the RRC setup request message and/or in the RRC setup complete message. This enables the network to determine that a re-direction, handover or frequency priority modification is needed for the UE, but the network does not need to store any UE context. For example, the serving cell (cell 2) may decide to re-direct the UE to another cell (cell 1) by setting frequency priorities with an RRC release command and enabling the UE to send the service request to the AMF through the new cell (cell 1), which supports the paged network slice.

The UE is configured with a registration area comprising a first tracking area (TA1) and a second tracking area (TA2). TA1 supports eMBB (but not URLLC) and comprises at least a first cell (cell 1). TA2 supports URLLC (but not eMBB) and comprises at least a second cell (cell 2). The first cell and the second cell may be controlled by the same network element (e.g., gNB or DU), or the first cell and the second cell may be controlled by different network elements (e.g., gNBs or DUs).

Referring to FIG. 6, in step 601, the UE is camping on the second cell in RRC idle or inactive state. The UE has eMBB and URLLC as allowed slices.

In step 602, the AMF determines to page the UE for eMBB MT data over the second cell, which does not support eMBB.

In step 603, the AMF transmits a first paging message to the network element controlling the second cell. The first paging message is transmitted together with the slice information of the first paging message. The slice information comprises an indication that the UE is paged for eMBB MT data. The first paging message may comprise the UE identity of the UE.

In step 604, the network element controlling the second cell uses the slice information to initiate a slice-specific re-direction procedure for the UE in order to re-direct the UE to the first cell, which supports eMBB (since the second cell does not support eMBB).

In step 605, the network element controlling the second cell transmits, to the UE, a second paging message corresponding to the first paging message, wherein the second paging message further comprises a token. The token may be, for example, a randomly generated number that may serve the same purpose as the flag described above with reference to FIG. 5. In addition, the token may help the network element to identify the UE when the UE connects to the first cell, without having to rely on the UE identity. The token may be added to the second paging message independently by the network element, or the AMF may indicate to the network element to add the token to the second paging message.

The UE does not yet initiate the service request upon receiving the second paging message. Instead, the UE waits until the re-direction procedure (i.e., steps 609-611) is completed.

For example, the UE access stratum (AS) layer receiving the token may not yet inform the NAS layer about the paging. In this case, the UE AS layer may inform the NAS layer after step 612 that the second paging message is received in order to trigger the service request (step 613).

Alternatively, the UE AS layer receiving the token may inform the NAS layer about the paging upon receiving the token, and the AS layer may request the NAS layer to suspend triggering the service request procedure. In this case, the UE AS layer may inform the NAS layer after step 612 to initiate the service request procedure (step 613).

In step 606, the UE transmits an RRC setup request message to the network element controlling the second cell in order to request establishing an RRC connection between the UE and the second cell. The RRC setup request message may comprise information on the UE identity (e.g., S-TMSI) of the UE.

In step 607, the network element controlling the second cell transmits an RRC setup message with an SRB1 configuration to the UE. The UE switches to RRC connected state.

In step 608, the UE transmits an RRC setup complete message to the network element controlling the second cell to indicate that the RRC connection is successfully established. The RRC setup complete message may comprise information on the UE identity (e.g., S-TMSI) of the UE.

The token may be included in the RRC setup request message (step 606) and/or in the RRC setup complete message (step 608) transmitted from the UE to the network element controlling the second cell.

In step 609, in case the token that is transmitted to the network element matches the token transmitted to the UE in the second paging message in step 605, the network element determines that a re-direction is needed for this UE, and thus the network element triggers (i.e., initiates) the re-direction to the first cell. The network element may take into account the token and the slice information from the AMF for re-directing the UE to the first cell.

In step 610, the network element controlling the second cell transmits an RRC release command to the UE in order to release the connection between the UE and the second cell. The RRC release command may be transmitted together with re-direction information comprising an identity of the first cell and/or a frequency priority indicative of the first cell.

In step 611, the UE performs a cell re-selection procedure to select the first cell based on the cell identity and/or the frequency priority. In other words, the cell identity and/or the frequency priority may be used as criteria for cell re-selection in order to make the UE select the first cell.

In step 612, the UE establishes an RRC connection to the network element controlling the first cell in order to connect (or reconnect) to the first cell. The UE switches to RRC connected state.

In step 613, upon connecting (or reconnecting) to the first cell, the UE transmits the service request to the network element controlling the first cell, and the network element transmits, or forwards, the service request to the AMF.

In case the UE connects (or reconnects) to another cell that does not support the paged slice, the UE may wait in idle state for another paging message, or the UE may reset the frequency priorities or re-direction in an attempt to return back to the original cell.

Figure 7:
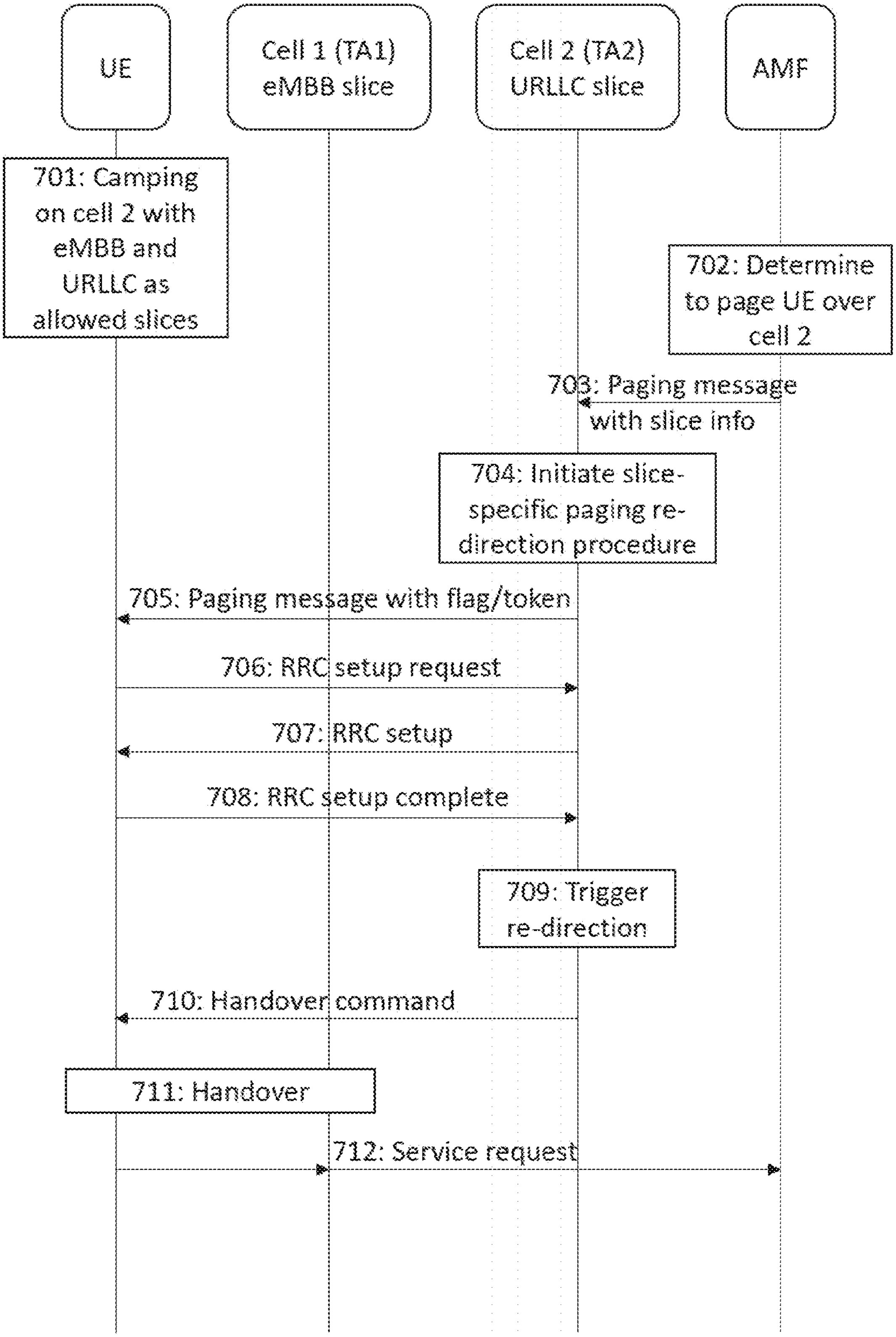

FIG. 7 illustrates a signaling diagram according to another exemplary embodiment, wherein the serving cell (cell 2) decides to hand over the UE to another cell (cell 1) by sending a handover command to the UE.

The UE is configured with a registration area comprising a first tracking area (TA1) and a second tracking area (TA2). TA1 supports eMBB (but not URLLC) and comprises at least a first cell (cell 1). TA2 supports URLLC (but not eMBB) and comprises at least a second cell (cell 2). The first cell and the second cell may be controlled by the same network element (e.g., gNB or DU), or the first cell and the second cell may be controlled by different network elements (e.g., gNBs or DUs).

Referring to FIG. 7, in step 701, the UE is camping on the second cell in RRC idle or inactive state. The UE has eMBB and URLLC as allowed slices.

In step 702, the AMF determines that it needs to page the UE for eMBB MT data over the second cell, which does not support eMBB.

In step 703, the AMF transmits a first paging message to the network element controlling the second cell. The first paging message is transmitted together with the slice information of the first paging message. The slice information comprises an indication for the second cell that the UE is paged for eMBB MT data. The first paging message may comprise the UE identity of the UE.

In step 704, the network element controlling the second cell uses the slice information to initiate a slice-specific re-direction procedure in order to re-direct the UE to the first cell, which supports eMBB (since the second cell does not support eMBB).

In step 705, the network element controlling the second cell transmits, to the UE, a second paging message corresponding to the first paging message, wherein the second paging message further comprises a token or a flag. The UE does not yet initiate the service request upon receiving the second paging message.

In step 706, the UE transmits an RRC setup request message to the network element controlling the second cell in order to request establishing an RRC connection between the UE and the second cell. The RRC setup request message may comprise information on the UE identity (e.g., S-TMSI) of the UE.

In step 707, the network element controlling the second cell transmits an RRC setup message with an SRB1 configuration to the UE. The UE switches to RRC connected state.

In step 708, the UE transmits an RRC setup complete message to the network element controlling the second cell to indicate that the RRC connection is successfully established. The RRC setup complete message may comprise information on the UE identity (e.g., S-TMSI) of the UE.

If the second paging message (in step 705) included a token, then the token may be included in the RRC setup request message and/or in the RRC setup complete message transmitted from the UE to the network element controlling the second cell.

In step 709, the network element controlling the second cell triggers (i.e., initiates) the re-direction procedure based at least partly on the token and/or the UE identity.

In step 710, the network element controlling the second cell transmits an RRC reconfiguration message comprising a handover command to the UE. The handover command indicates to the UE to perform a handover from the second cell to the first cell.

In step 711, the UE executes (i.e., performs) the handover from the second cell to the first cell.

In step 712, upon completing the handover, the UE transmits the service request to the network element controlling the first cell, and the network element transmits (or forwards) the service request to the AMF.

In another exemplary embodiment, the UE may be registered to the network via both 3GPP access and non-3GPP access. In such a case, the AMF may decide to send a notification message to the UE via non-3GPP access instead of sending a paging message over 3GPP access. The notification message sent via non-3GPP access may include the slice information. After receiving the notification message, the UE may perform cell re-selection based on the notification message.

Figure 8:
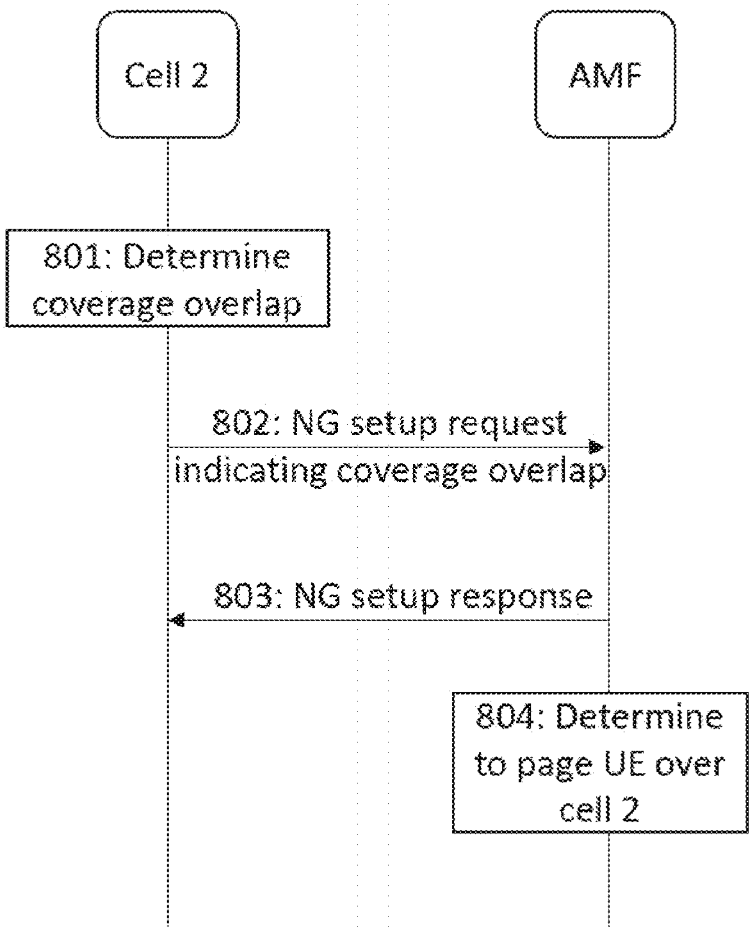

FIG. 8 illustrates a signaling diagram according to another exemplary embodiment. In this exemplary embodiment, the serving cell (cell 2) of a UE sends assistance information to the AMF in advance of the paging message. In the assistance information, the serving cell may indicate to the AMF that there is overlapping radio coverage with another cell (cell 1), which supports a certain network slice denoted as “x” (e.g., eMBB). The overlapping radio coverage means that the UE is within the radio coverage of the second cell, as well as within the radio coverage of the first cell. In other words, the radio coverages of the first cell and the second cell may at least partially overlap at the specific location of the UE. Using this information, the AMF may determine to page the UE for slice “x” over the second cell.

The first cell may belong to a first tracking area (TA1), and the second cell may belong to a second tracking area (TA2). For example, TA1 may support eMBB (but not URLLC), and TA2 may support URLLC (but not eMBB). The first cell and the second cell may be controlled by the same network element (e.g., gNB or DU), or the first cell and the second cell may be controlled by different network elements (e.g., gNBs or DUs).

Referring to FIG. 8, in step 801, the network element controlling the second cell determines that there is a radio coverage overlap between the first cell and the second cell at the location of the UE after successful dual connectivity (DC) establishment to that cell, or after receiving measurement reports of the first cell. For example, the network element controlling the second cell may receive one or more measurement reports associated with a certain time instant from the UE, and this network element may then determine, based on the received one or more measurement reports, that the first cell and the second cell had overlapping coverage at the location of the UE at that certain time instant.

In step 802, the network element controlling the second cell transmits an NG setup request message to the AMF, wherein the NG setup request message comprises assistance information indicating that the radio coverage overlap between the first cell and the second cell at the location of the UE.

In step 803, the AMF transmits an NG setup response message to the network element controlling the second cell to indicate that the AMF accepts the NG setup.

The purpose of the NG setup procedure is to exchange application-level data needed for the AMF and the network element controlling the second cell to correctly interoperate on the NG-C interface.

In step 804, the AMF determines, based at least partly on the assistance information provided by the network element controlling the second cell, to page the UE over the second cell for the network slice (e.g., eMBB) supported by the first cell.

Figure 9:
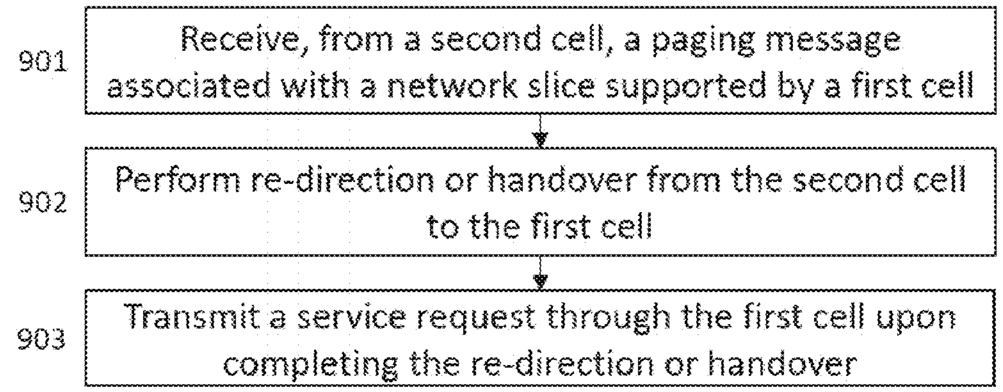
FIGS. 9, 10 and 11 illustrate flow charts according to some exemplary embodiments.

FIG. 9 illustrates a flow chart according to an exemplary embodiment. The steps illustrated in FIG. 9 may be performed by an apparatus such as, or comprised in, a terminal device. The terminal device may also be referred to as a UE or user equipment herein.

Referring to FIG. 9, in step 901, a paging message associated with a network slice supported by a first cell is received from a second cell, wherein the paging message comprises at least an indication indicating the apparatus to wait for a command indicative of performing a re-direction or a handover from the second cell to the first cell before transmitting a service request to a network associated with the first cell and the second cell. The indication may refer to, for example, the flag or token described above.

In step 902, the re-direction or the handover from the second cell to the first cell is performed upon receiving the command indicative of performing the re-direction or the handover from the second cell to the first cell.

In step 903, the service request is transmitted through the first cell upon completing the re-direction or the handover from the second cell to the first cell, wherein the service request indicates a request for establishing a protocol data unit session between the apparatus and the network, wherein the protocol data unit session is associated with the network slice.

Figure 10:
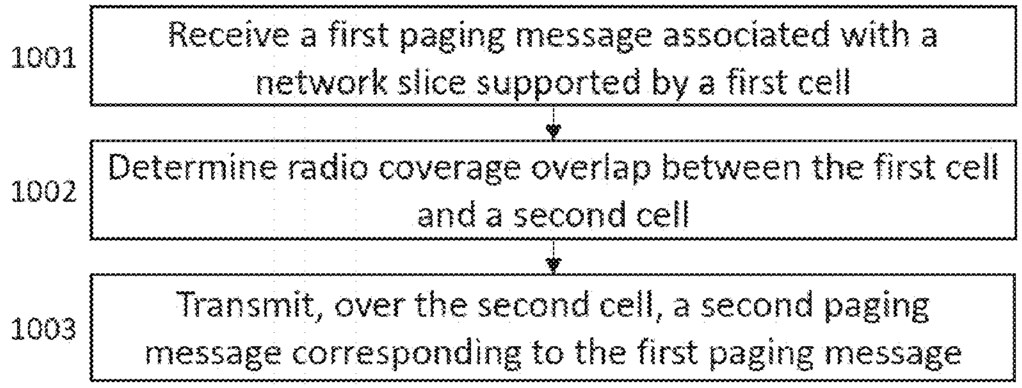

FIG. 10 illustrates a flow chart according to an exemplary embodiment. The steps illustrated in FIG. 10 may be performed by an apparatus such as, or comprised in, a network element in a radio access network (RAN). The network element may also be referred to as a base station, gNB, or DU herein.

Referring to FIG. 10, in step 1001, a first paging message for a terminal device is received from an access and mobility management function (AMF) in a core network, wherein the first paging message is associated with a network slice supported by a first cell.

In step 1002, a radio coverage overlap between the first cell and a second cell is determined, wherein the second cell is controlled by the apparatus.

In step 1003, a second paging message corresponding to the first paging message is transmitted over the second cell, wherein the second paging message comprises at least an indication indicating the terminal device to wait for a command indicative of performing a re-direction or a handover from the second cell to the first cell before transmitting a service request to the network for establishing a protocol data unit session between the terminal device and the core network, wherein the protocol data unit session is associated with the network slice. The second paging message is associated with the network slice supported by the first cell.

Figure 11:
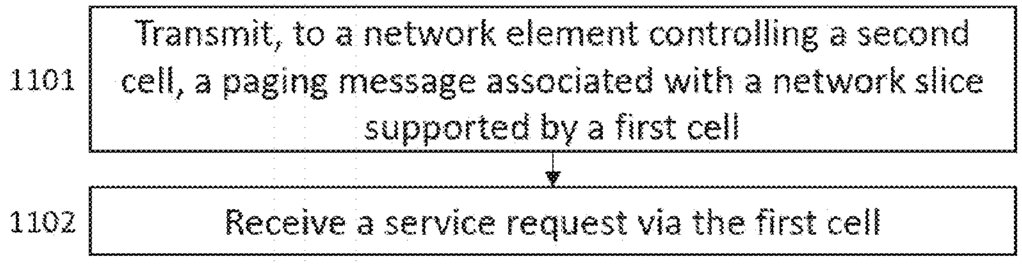

FIG. 11 illustrates a flow chart according to an exemplary embodiment. The steps illustrated in FIG. 11 may be performed by an apparatus such as, or comprised in, an access and mobility management function (AMF) in a core network.

Referring to FIG. 11, in step 1101, a paging message for a terminal device is transmitted to a network element controlling a second cell, wherein the paging message is associated with a network slice supported by a first cell.

In step 1002, a service request is received from the terminal device via the first cell, wherein the service request indicates a request for establishing a protocol data unit session between the terminal device and the core network, wherein the protocol data unit session is associated with the network slice.

The steps and/or blocks described above by means of FIGS. 5-11 are in no absolute chronological order, and some of them may be performed simultaneously or in an order differing from the described one. Other steps and/or blocks may also be executed between them or within them.

In some exemplary embodiments, the association of the paging message with the network slice may be indicated by slice group information, for example a slice group identity, of a slice group comprising at least the network slice. In other words, the slice information in the paging message may comprise slice group information for the slice group, where the slice group may be mapped to multiple network slices.

A technical advantage provided by some exemplary embodiments is that they may provide means to page a UE in registration areas with non-homogenous network slice support by using slice-specific re-direction. In other words, some exemplary embodiments may enable a UE to receive a paging message over a second cell for a network slice supported by a first cell (but not supported by the second cell), if the radio coverages of the first cell and the second cell are at least partially overlapping and the UE is camping on the second cell. In addition, some exemplary embodiments may reduce signaling overhead compared to a situation, where the AMF transmits the paging message to all cells in the registration area of the UE.

Figure 12:
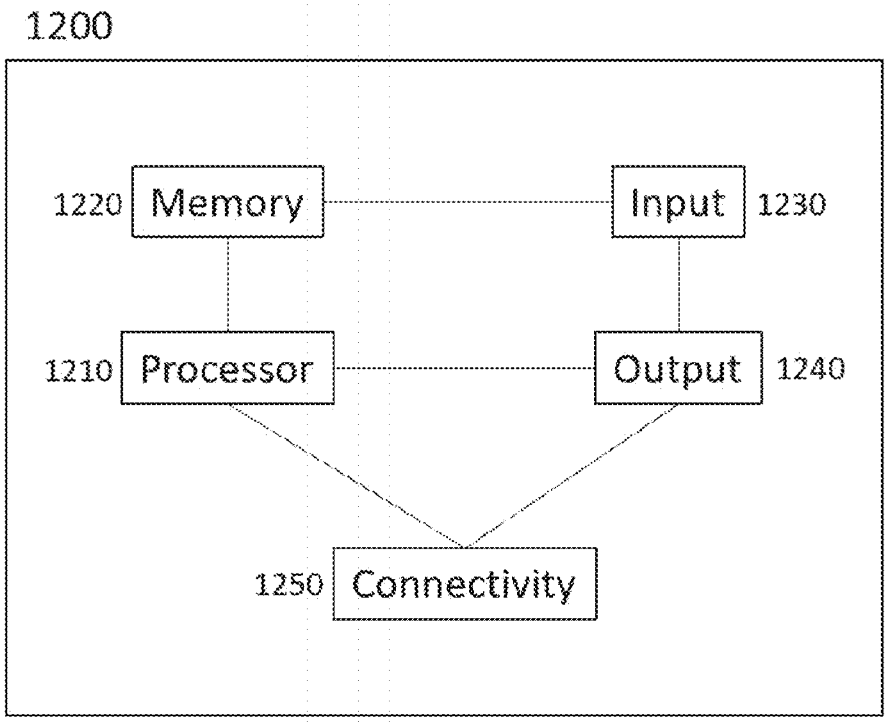
FIGS. 12 and 13 illustrate apparatuses according to some exemplary embodiments.

FIG. 12 illustrates an apparatus 1200, which may be an apparatus such as, or comprised in, a terminal device, according to an exemplary embodiment. The terminal device may also be referred to as a UE or user equipment herein. The apparatus 1200 comprises a processor 1210. The processor 1210 interprets computer program instructions and processes data. The processor 1210 may comprise one or more programmable processors. The processor 1210 may comprise programmable hardware with embedded firmware and may, alternatively or additionally, comprise one or more application-specific integrated circuits (ASICs).

The processor 1210 is coupled to a memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1220 stores computer readable instructions that are executed by the processor 1210. For example, non-volatile memory stores the computer readable instructions and the processor 1210 executes the instructions using volatile memory for temporary storage of data and/or instructions.

The computer readable instructions may have been prestored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1200 may further comprise, or be connected to, an input unit 1230. The input unit 1230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1230 may comprise an interface to which external devices may connect to.

The apparatus 1200 may also comprise an output unit 1240. The output unit may comprise or be connected to one or more displays capable of rendering visual content, such as a light emitting diode (LED) display, a liquid crystal display (LCD) and/or a liquid crystal on silicon (LCoS) display. The output unit 1240 may further comprise one or more audio outputs. The one or more audio outputs may be for example loudspeakers.

The apparatus 1200 further comprises a connectivity unit 1250. The connectivity unit 1250 enables wireless connectivity to one or more external devices. The connectivity unit 1250 comprises at least one transmitter and at least one receiver that may be integrated to the apparatus 1200 or that the apparatus 1200 may be connected to. The at least one transmitter comprises at least one transmission antenna, and the at least one receiver comprises at least one receiving antenna. The connectivity unit 1250 may comprise an integrated circuit or a set of integrated circuits that provide the wireless communication capability for the apparatus 1200. Alternatively, the wireless connectivity may be a hardwired application-specific integrated circuit (ASIC). The connectivity unit 1250 may comprise one or more components such as a power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 1200 may further comprise various components not illustrated in FIG. 12. The various components may be hardware components and/or software components.

Figure 13:
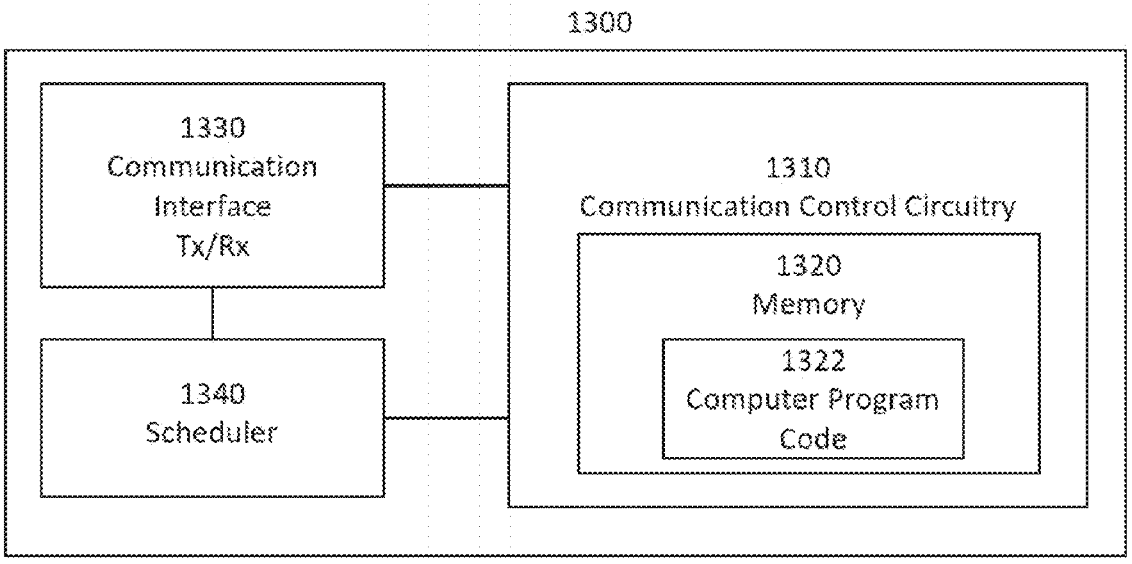

The apparatus 1300 of FIG. 13 illustrates an exemplary embodiment of an apparatus such as, or comprised in, a network element of a wireless communication network. The network element may also be referred to, for example, as a network node, a RAN node, a NodeB, an LTE evolved NodeB (eNB), a gNB, a base station, a first base station, a second base station, an NR base station, a 5G base station, an access node, an access point (AP), a distributed unit (DU), a central unit (CU), a baseband unit (BBU), a radio unit (RU), a radio head, a remote radio head (RRH), a transmission and reception point (TRP), or an access and mobility management function (AMF). The apparatus 1300 may comprise, for example, a circuitry or a chipset applicable for realizing some of the described exemplary embodiments. The apparatus 1300 may be an electronic device comprising one or more electronic circuitries. The apparatus 1300 may comprise a communication control circuitry 1310 such as at least one processor, and at least one memory 1320 including a computer program code (software) 1322 wherein the at least one memory and the computer program code (software) 1322 are configured, with the at least one processor, to cause the apparatus 1300 to carry out some of the exemplary embodiments described above.

The processor is coupled to the memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1320 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1300 may further comprise a communication interface 1330 comprising hardware and/or software for realizing communication connectivity according to one or more communication protocols. The communication interface 1330 comprises at least one transmitter (Tx) and at least one receiver (Rx) that may be integrated to the apparatus 1300 or that the apparatus 1300 may be connected to. The communication interface 1330 provides the apparatus with radio communication capabilities to communicate in the cellular communication system. The communication interface may, for example, provide a radio interface to terminal devices. The apparatus 1300 may further comprise another interface towards a core network such as the network coordinator apparatus and/or to the access nodes of the cellular communication system. The apparatus 1300 may further comprise a scheduler 1340 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

receive, from a second cell, a paging message associated with a network slice supported by a first cell, wherein the paging message comprises at least an indication indicating the apparatus to wait for a command indicative of performing a re-direction or a handover from the second cell to the first cell before transmitting a service request to a network associated with the first cell and the second cell;

perform the re-direction or the handover from the second cell to the first cell upon receiving the command indicative of performing the re-direction or the handover from the second cell to the first cell; and transmit, through the first cell, the service request upon completing the re-direction or the handover from the second cell to the first cell, wherein the service request indicates a request for establishing a protocol data unit session between the apparatus and the network, wherein the protocol data unit session is associated with the network slice.

2. The apparatus according to claim 1, wherein the indication comprises a token; wherein the apparatus is further caused to:

transmit, to the second cell, a message comprising at least the token; and receive, from the second cell, the command indicative of performing the re-direction or the handover from the second cell to the first cell.

3. The apparatus according to claim 1, wherein the apparatus is further caused to:

transmit, to the second cell, in response to receiving the paging message comprising the indication, one or more messages indicating at least an information on an identity of the apparatus; and receive, from the second cell, the command indicative of performing the re-direction or the handover from the second cell to the first cell.

4. The apparatus according to claim 1, wherein the command comprises a handover command for performing the handover from the second cell to the first cell.

5. The apparatus according to claim 1, wherein the command comprises a radio resource control release command for releasing a connection with the second cell; and wherein the command further indicates a cell identity associated with the first cell, and/or a frequency priority indicative of the first cell.

6. The apparatus according to claim 1, wherein the apparatus is further caused to:

wait, by an access stratum layer of the apparatus, for the completion of the re-direction or the handover from the second cell to the first cell before indicating, to a non-access-stratum layer of the apparatus, that the paging message is received;

wherein the service request is initiated by the non-access stratum layer based on the indicating by the access-stratum layer.

7. The apparatus according to claim 1, wherein the apparatus is further caused to:

upon receiving the paging message, request, by an access-stratum layer of the apparatus, to a non-access-stratum layer of the apparatus, to suspend triggering the service request; and upon completing the re-direction or the handover from the second cell to the first cell, indicate, by the access-stratum layer, to the non-access-stratum layer, to initiate the service request;

wherein the service request is initiated by the non-access stratum layer based on the indicating by the access-stratum layer.

8. The apparatus according to claim 1, wherein the apparatus is within a radio coverage of the first cell and the second cell.

9. The apparatus according to claim 1, wherein the network slice associated with the paging message is an allowed network slice of the apparatus and is not supported by the second cell.

10. The apparatus according to claim 1, wherein the association of the paging message with the network slice is indicated by slice group information of a slice group comprising at least the network slice.

11. The apparatus according to claim 1, wherein the apparatus comprises, or is comprised in, a terminal device.

12. An apparatus comprising means for:

receiving, from a second cell, a paging message associated with a network slice supported by a first cell, wherein the paging message comprises at least an indication indicating the apparatus to wait for a command indicative of performing a re-direction or a handover from the second cell to the first cell before transmitting a service request to a network associated with the first cell and the second cell;

performing the re-direction or the handover from the second cell to the first cell upon receiving the command indicative of performing the re-direction or the handover from the second cell to the first cell; and transmitting, through the first cell, the service request upon completing the re-direction or the handover from the second cell to the first cell, wherein the service request indicates a request for establishing a protocol data unit session between the apparatus and the network, wherein the protocol data unit session is associated with the network slice.

13. An apparatus comprising means for:

receiving, from an access and mobility management function in a network, a first paging message for a terminal device, wherein the first paging message is associated with a network slice supported by a first cell;

determining a radio coverage overlap between the first cell and a second cell, wherein the second cell is controlled by the apparatus; and transmitting, over the second cell, a second paging message corresponding to the first paging message, wherein the second paging message comprises at least an indication indicating the terminal device to wait for a command indicative of performing a re-direction or a handover from the second cell to the first cell before transmitting a service request to the network for establishing a protocol data unit session between the terminal device and the network, wherein the protocol data unit session is associated with the network slice.

* * * * *